US006068280A

United States Patent [19]

Torres

[11] Patent Number: 6,068,280
[45] Date of Patent: May 30, 2000

[54] SELF-LEVELING SEAT FOR A WHEELCHAIR

[76] Inventor: Hank G. Torres, 7 Ridgemeadow Way, Round Rock, Tex. 78664

[21] Appl. No.: 08/712,394

[22] Filed: Sep. 13, 1996

[51] Int. Cl.[7] .................................. B60K 1/00; B60N 2/10

[52] U.S. Cl. ..................... 280/304.1; 180/65.1; 180/328; 180/907; 297/314; 297/325; 297/330

[58] Field of Search ......................... 280/304.1, DIG. 10, 280/5.2–5.32; 180/328, 326, 65.1, 65.2, 907, 327, 329, 330; 297/313, 314, 325, 330, 344.1, 344.14; 244/122 A, 118.6; 114/194; 248/371, 188.2

[56] References Cited

U.S. PATENT DOCUMENTS

| | | | |
|---|---|---|---|
| 2,707,986 | 5/1955 | Johnson . | |
| 3,018,992 | 1/1962 | Lore . | |
| 3,658,286 | 4/1972 | Terai et al. | 248/371 |
| 4,095,770 | 6/1978 | Long | 248/371 |
| 4,360,182 | 11/1982 | Titus | 248/371 |
| 4,432,425 | 2/1984 | Nitzberg | 180/DIG. 3 |
| 4,564,080 | 1/1986 | Pagett | 180/8.2 |
| 4,566,551 | 1/1986 | Feliz | 180/9.1 |
| 4,566,707 | 1/1986 | Nitzberg | 180/8.2 |
| 4,614,246 | 9/1986 | Masse et al. | 180/6.5 |
| 4,641,848 | 2/1987 | Ayers | 280/647 |
| 4,687,068 | 8/1987 | Pagett | 180/8.2 |
| 4,759,561 | 7/1988 | Janssen | 297/325 |
| 4,790,548 | 12/1988 | Decelles et al. | 280/5.26 |
| 5,044,647 | 9/1991 | Patterson | 280/250.1 |
| 5,046,694 | 9/1991 | Martin | 248/188.2 |
| 5,096,008 | 3/1992 | Mankowski | 180/6.5 |
| 5,123,495 | 6/1992 | Littlejohn et al. | 180/9.32 |
| 5,137,102 | 8/1992 | Houston, Sr. et al. | 180/65.5 |
| 5,193,633 | 3/1993 | Ezenwa | 180/65.1 |
| 5,248,007 | 9/1993 | Watkins et al. | 180/9.32 |
| 5,297,021 | 3/1994 | Koerlin et al. | 180/907 |
| 5,341,894 | 8/1994 | Van Gorder, Jr. et al. | 180/271 |
| 5,730,236 | 3/1998 | Miller et al. | 180/65.1 |
| 5,772,237 | 6/1998 | Finch et al. | 280/704 |

FOREIGN PATENT DOCUMENTS

| | | |
|---|---|---|
| 3150193 | 6/1983 | Germany . |
| 3150193 A1 | 6/1983 | Germany . |
| 2 094 627 | 2/1981 | United Kingdom . |

*Primary Examiner*—Anne Marie Boehler
*Attorney, Agent, or Firm*—Hudak & Shunk Co., L.P.A.

[57] ABSTRACT

A wheelchair provides a seat mounted to a base preferably through use of a universal joint to provide for selective orientation of the seat. A pair of actuators are interposed between the seat and base so that selective extension and retraction of the actuators orients the seat as desired. A level sensing device(s) provides suitable output signals to control the extension and retraction of the actuators, and thus the final orientation of the seat. This allows a wheelchair occupant to remain level while the chair traverses uneven ground or to selectively reposition the seat to relieve pressure points without the assistance of an attendant.

17 Claims, 3 Drawing Sheets

SELF-LEVELING SEAT FOR A WHEELCHAIR

BACKGROUND OF THE INVENTION

This invention pertains to the art of wheelchairs and, more particularly, to a wheelchair seat assembly that provides self-leveling capabilities to a wheelchair occupant. The invention is particularly applicable to a power wheelchair and will be described with reference thereto. However, it will be appreciated that the invention has broader applications and may be advantageously employed in manual wheelchair environments and applications, related home health care products, or perhaps still other related seat applications.

Wheelchairs are used by people with various infirmities. Those wheelchair occupants that have limited upper body muscle control or suffer from some type of paralysis, for example, are unable to easily balance themselves or compensate for an uneven ground surface over which the wheelchair passes. Because of this impaired balance, wheelchair users are extremely cautious and have a reoccurring fear of losing their balance or control over uneven or sloping terrain. Even when an attendant is available to assist the wheelchair occupant, the inability to control one's balance can be an imposing fear. This fear is heightened when a power wheelchair user, more accustomed to his or her freedom associated with individual control, is then placed in a situation where the ground surface causes momentary instability or loss of balance. Moreover, many surfaces over which the wheelchair traverse are not, in fact, level. Therefore, it is a frequent or common disturbance and concern for the wheelchair occupant.

These same wheelchair users are confined to their chair for substantially all of their waking hours. Commercially available products provide limited pressure relief for the occupant, for example, by changing the orientation of the user or providing specially designed seat cushions to alleviate pressure points. Reclining and tilt-in-space features for wheelchair seats are particular examples of products where the orientation of the wheelchair occupant is altered or modified to provide pressure relief. Typically, though, the recline and tilt-in-space features require an attendant to reposition the seat position relative to the ground. Thus, and even though this provides temporary relief, it requires the assistance of an attendant and is not automatically actuated by the wheelchair occupant.

Thus, a need exists for a wheelchair, and particularly a wheelchair seat, that is responsive to uneven terrain. An additional need exists for ease of adjustment to address pressure relief aside from mere weight shifting by the occupant. Additionally, although the concept is more adaptable to power wheelchairs because of the battery already used to drive the chair, it will be understood that such a feature should be adaptable to an attended wheelchair that has a power supply to provide an automatic or selective self-leveling feature if so desired.

SUMMARY OF THE INVENTION

The present invention contemplates a new and improved wheelchair, specifically a self-leveling seat for a wheelchair, that overcomes all of the above-referenced problems and others and provides an effective, responsive system for altering the orientation of a seat relative to the frame.

According to the present invention, there is provided a wheelchair having a base or frame to which is rotatably secured a set of wheels. A seat adapted to receive an occupant is mounted to the frame via a joint that has at least two degrees of freedom.

According to another aspect of the invention, a sensing device is provided that monitors whether the seat is level relative to the ground surface and provides a signal to actuators that adjust the position of the seat in response thereto.

According to yet another aspect of the invention, an actuator assembly is disposed between the frame and the seat to provide the desired movement of the seat.

A principal advantage of the invention resides in the ease with which a self-leveling seat is provided for a wheelchair user.

Yet another advantage of the invention resides in the ability of a wheelchair user to selectively alter the orientation of the seat to change pressure points that develop over an extended period of time without assistance from an attendant.

Still another advantage of the invention resides in the simple structure employed to provide the orientation and self-leveling features.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment of which will be described in detail in this specification. The invention will also be illustrated in the accompanying drawings which form a part of this invention, and wherein.

DETAILED DESCRIPTION OF THE PREFERRED EMBODIMENT

Figure 1:
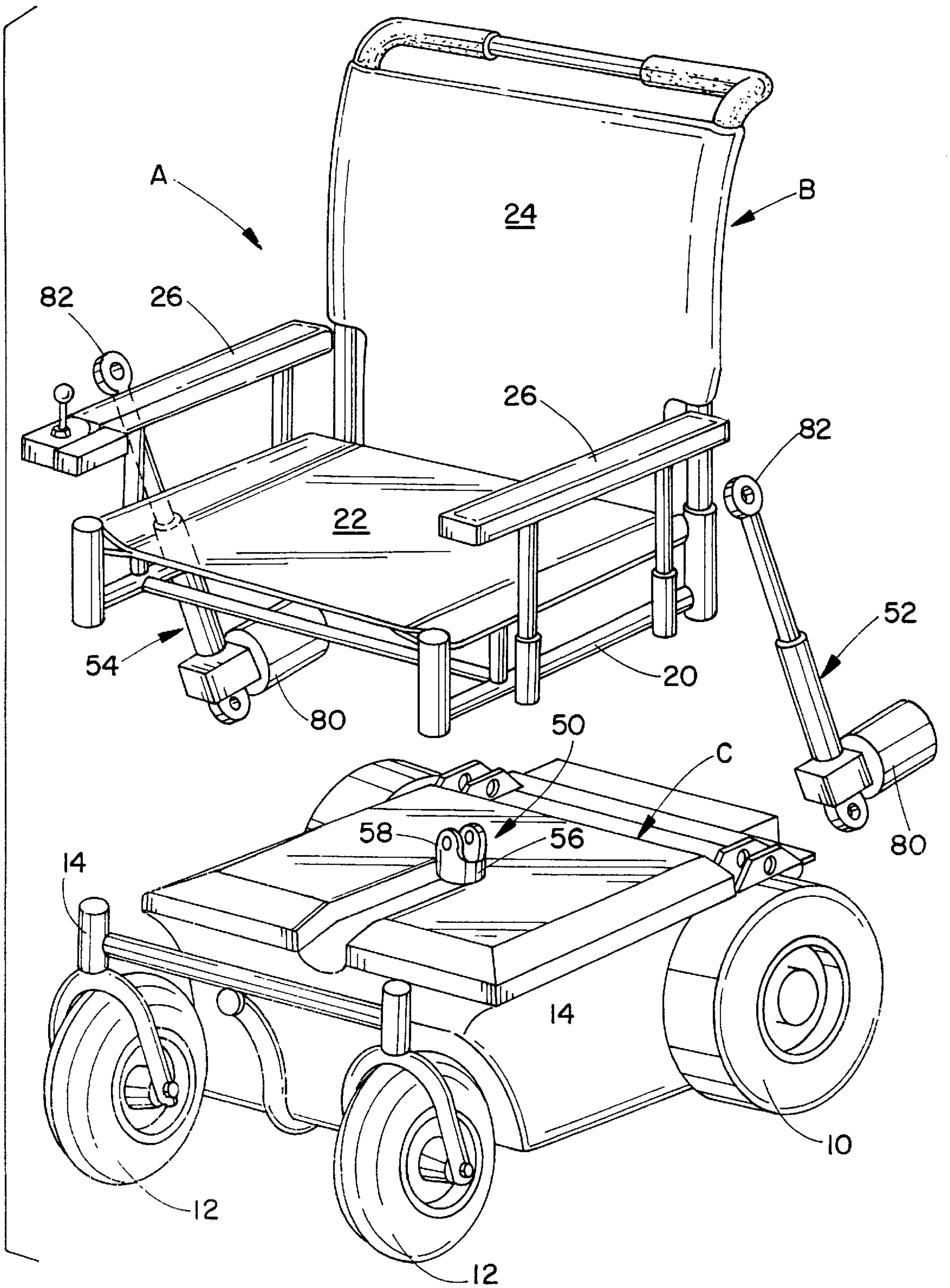
FIG. 1 is an exploded perspective view of a power wheelchair that includes a self-leveling seat assembly in accordance with the teachings of the present invention.

Referring now to the drawings wherein the showings are for the purposes of illustrating the preferred embodiment of the invention only and not for purposes of limiting same, the FIGURES show a wheelchair A, shown here as a power wheelchair, having a seat assembly B that is mounted to a base or frame C. The wheelchair includes a seat assembly that provides automatic self-leveling features or selective adjustment of the seat as desired by the occupant. It will be understood that the following structure and features of the improved seat assembly of the power wheelchair are equally applicable to related home health care products, i.e., scooters, manual wheelchairs, etc.

More particularly, and with reference to FIG. 1, the wheelchair A includes a set of rear wheels 10 and a set of front wheels 12 rotatably mounted to the base in a conventional manner. Typically, the rear wheels are mounted for rotation about a fixed horizontal axis while the front wheels are mounted via a fork that extends downwardly from a caster assembly 14 mounted on the front of the base to allow rotation about individual vertical caster axes. The base is designed to allow free rotation of the front wheels in a full circle or 360 degrees of rotation to provide controlled steering of the wheelchair. More specifically, the rear wheels 10 are usually driven by electric motors that are, in turn, powered by one or more batteries carried in the base. Moreover, the number or size of the wheels may change depending on the particular wheelchair, scooter, etc. that employs the subject invention. For example, the seat assembly B is also applicable to wheelchairs where the large wheels are positioned in the front, or where all wheels are substantially the same size, or to arrangements that only employ three wheels.

Suitable electronic controls are operatively connected to the battery and rear wheel drive motors. A joystick assembly 16 is illustrated, although touch sensitive switches, pneumatic switches (sip and puff), and other well known switch arrangements could be used with equal success, to provide suitable operator (or selected attendant) control. When equal power is provided to the left and right rear wheels, the wheelchair travels in a straight line. The wheelchair travels either forwardly or rearwardly depending on the similar direction of rotation of the rear wheels. Movement of the joy stick to the right or left alters the speed at which the respective right and left motors drive the rear wheels to provide desired steering to the right or left. That is, and as is well known in the art, increased rotational speed of the left rear wheel relative to the right rear wheel in the forward direction effects a turn to the right. Likewise, increased rotational speed of the right rear wheel relative to the left rear wheel allows the wheelchair to turn to the left. The caster mounted front wheels rotate about their vertical axes in response to the power supplied to the rear wheels so that a stable, smooth turning operation is achieved. The drive motors may be driven in opposite directions to complete a tight turn or power to one drive motor is cut off while the other rear drive wheel is driven to provide a more gradual turn. Again, more particular details of the structure and operation of a power wheelchair of this type are well known in the art, and form no part of the subject invention, so that further discussion herein is deemed unnecessary to a full and complete understanding of the present invention. Additionally, all of these features are equally applicable to a wheelchair employing front wheel drive.

The seat assembly B preferably includes a rigid support frame assembly 20 to which is mounted a seat portion 22 and a seat back 24. The frame assembly is often a tubular frame structure that allows a number of add-on features to be used with the wheelchair, and as will be described in greater detail below, although the particular details can be advantageously used with other frame arrangements. A pair of support arms 26 extend along the sides of the seat portions and forwardly of the seat back in a conventional manner.

Conventional foot or leg support assemblies or riggings 28 are mounted to opposite sides and at the front ends of the frame assembly 20. The footrest assemblies can adopt any of a number of commercially available front rigging configurations such as extendible footrests, elevating leg rests, etc. including the illustrated swing away assemblies that pivot about vertical axes 30 defined in the frame 20.

The seat assembly shown in FIG. 1 is often referred to as a sling style seat and is used on a number of manual and power wheelchairs. This type of seat accommodates a wide range of seat widths, seat back heights, and positioning aids such as head supports, side panel cushions, abductor pads, and the like. It also more easily accommodates specialized seat cushions for increased comfort and conformity to the wheelchair occupant. It will be understood that a van style seat, offered as an option on power wheelchairs of this type, may also be used in accordance with the present invention. However, the van style seat is typically not used for wheelchair users who lack the upper body control or lack balance control that is the primary concern of the subject invention.

In presently available commercial models, the seat assembly is secured to the base. Thus, and as described in the Background of the Invention section, a wheelchair occupant shifts his or her weight to provide temporary relief against pressure points. Alternatively, some wheelchairs are equipped with a tilt-in-space seat, i.e., a structure where the entire seat is manually tilted about a horizontal axis relative to the frame, or a reclining seat back in a wheelchair, where the angle between the seat back and seat portion may be selectively adjusted, which can also provide relief from pressure points. There is even available a power recliner that provides convenient power control of the angle of the seat back relative to the seat portion by either the attendant or the occupant. None of these wheelchairs, however, provide an arrangement whereby the occupant can adjust his or her orientation about more than one axis, or where the seat automatically adjusts, or self-levels, irrespective of the slope of the terrain over which the wheelchair travels.

Figure 2:
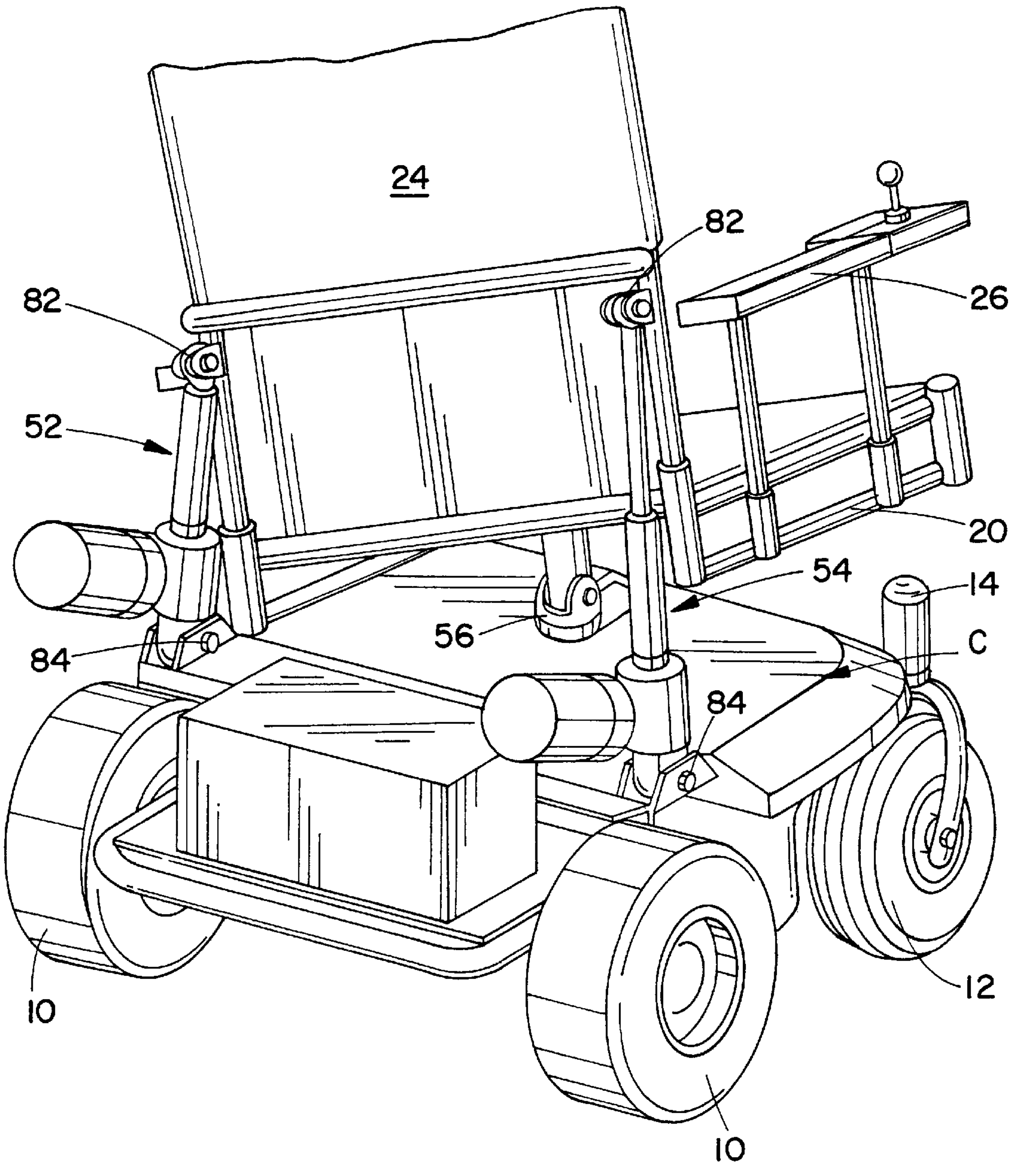
FIG. 2 is an enlarged view of a power wheelchair particularly illustrating preferred actuators used in the self-leveling seat assembly.
Figure 3:
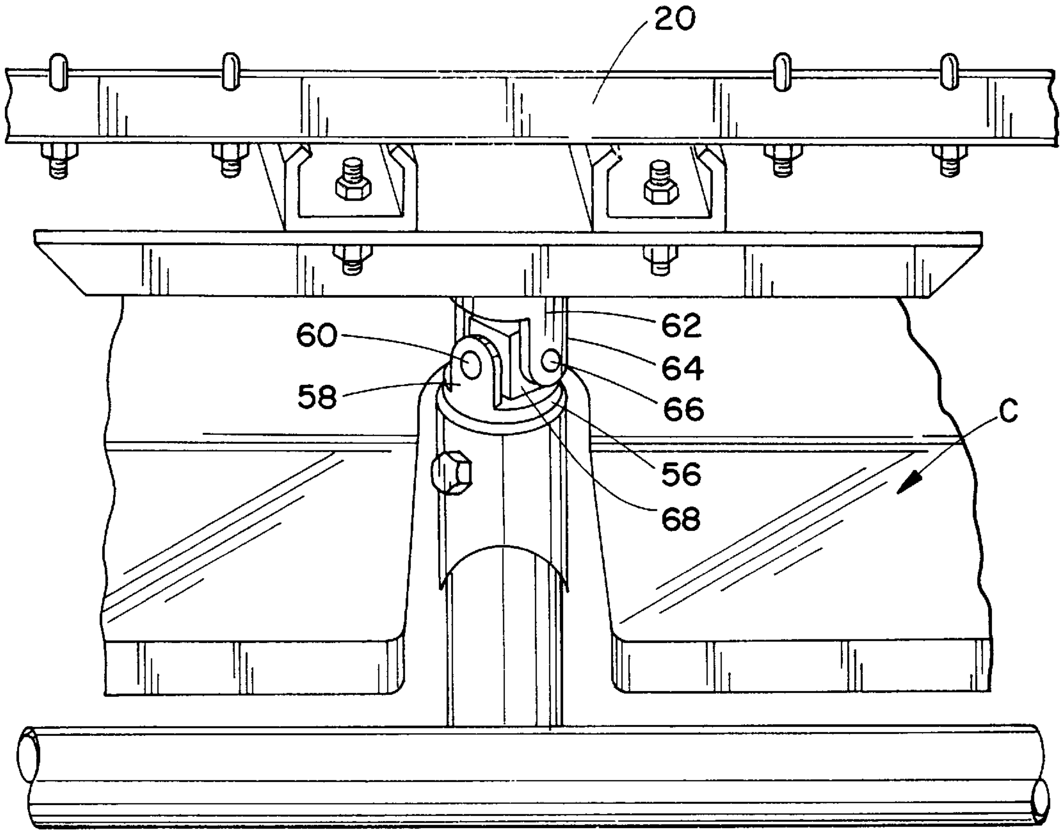
FIG. 3 is an enlarged detail view of a universal joint interconnecting the seat to the base frame.

As best illustrated in FIG. 2, according to a preferred embodiment of the invention, the seat is mounted to the base via a universal joint 50. An actuator assembly, comprised here of a first actuator 52 and a second actuator 54, also is disposed between the base and seat that holds the seat in a desired position and quickly and effectively alters the position of the seat as needed. The universal joint has a first member 56 secured to the base with a yoke 58 extending from the first member to receive a first pin 60. Likewise, a second member 62 of the universal joint has a yoke 64 that receives a second pin 66. The pins pass through a central block 68 encompassed by the yokes so that at least two degrees of freedom are provided for relative movement between the seat and base. More specifically, the seat can pivot about an axis defined through the pin 60, as well as providing pivotal movement about an axis that extends through the second pin 66. Of course, related joint assemblies that provide two or more degrees of freedom of movement can be used. For example, a third degree of freedom where the seat can be vertically raised or lowered may be provided by adding an additional actuator to accomplish this action. Such additional degrees of freedom are with the scope and intent of the subject invention.

The first and second actuators 52, 54 permit the seat to adopt various orientations relative to the base. That is, the entire seat can be pivoted fore and aft by similarly extending both actuators or retracting both actuators. By extending one actuator while retracting the other, side-to-side pivoting movement is achieved. As will be recognized, since the universal joint is secured to both the base and the seat, the seat can thereby tilt in a number of directions and adopt various angular orientations in light of the selected extension and retraction of the actuators.

When a wheelchair occupant is seated for extended periods of time and seeks pressure relief, the controls can be used to allow the occupant to selectively shift the orientation of the seat. Thus, it will be understood that the seat may not be oriented in a level position for this feature (i.e., the seat portion will not be positioned normal to the direction of gravity). Rather, since the goal is pressure relief, orientations other than horizontal may be desired by the wheelchair occupant.

When used as an automatic self-leveler, a level sensing device, such as a pendulum assembly, is mounted to the seat. A commercially available level sensing device is sold by Humphrey Incorporated as Model CP17-0601-1. The pendulum is provided with an AC or DC potentiometer output. The pendulum provides a suitable output signal that is compared with a reference signal provided by a separate potentiometer. The two signals are buffered, summed, and compared to a fixed voltage. The output of that comparison provides a signal that is proportional to the angle of the chair. The signals from the pendulum sensors are connected by digital logic to relays that apply full power to the actuators. Thus, by providing two identical sets of controls, for example one for a pair of orthogonal planes (a first plane, for example, being defined from northeast to southwest and the second plane being defined from northwest to southeast where the north direction represents the front of the seat, the south direction represents the rear of the seat and the east and west directions represent the sides of the seat), a pair of signals will cause the seat to pivot in a desired direction to maintain the seat in a level position even though the base of the wheelchair is oriented on a slope.

Alternatively, the pendulum sensors can be substituted by equivalent sensors and circuitry. For example, the pendulum sensors and associated relay control of the actuator assembly can be replaced by accelerometers, dynamic devices that detect acceleration and compute the change, or a combination of static and dynamic devices could be used. Semiconductor based micro-sensors and more sophisticated electronic drive control arrangements allow microprocessor based control and perhaps use of Fuzzy logic to attain the self-leveling seat features. Moreover, substitution of the pendulum sensors with, for example, piezo-resistive, semiconductor accelerometers provide small, inexpensive, fast and accurate sensors that are easy to integrate into the control system. A preferred embodiment incorporated a pair of accelerometers (Analog Devices ADXL05) mounted so that the sensitive axis of each was perpendicular to the axis of gravity and perpendicular to each other. Associated electronics for implementing the control functions can use a commercially available microprocessor, such as a Motorola 68HC11 microprocessor. Additionally, the drives for the actuators can be modified by using a full H-bridge drive for each motor using power MOSFETs that allow simple implementation of a bidirectional, variable speed drive. Consideration could also be given to using brushless DC motors, stepper motors, and/or AC motors as the actuators with, perhaps, Fuzzy logic control.

The actuators are preferably a pair of AC or DC motors, such as permanent magnetic brush type motors powered by the batteries. The actuators provide precision control of the seat. In a preferred embodiment, the actuators are mounted at the rear left (southwest) and rear right (southeast) portions of the seat back. First ends 80 of each actuator are secured to the base while second ends 82 are secured to the seat back, for example at about mid-height of the seat back. Of course other actuators (for example, stepping motors that are digitally controlled) or mounting arrangements may be used without departing from the overall scope and intent of the subject invention.

In operation, the seat portion of the wheelchair attempts to maintain a level position, that is the position of the seat relative to the axis of gravity is sensed. The actuator assembly automatically re-positions the seat, if necessary, without operator intervention. Thus, even if the terrain has a slope, the wheelchair occupant can be maintained in a level position.

If desired, the reference position of the seat can be altered. That is, there may be instances where an occupant desires that the seat automatically positions itself at a position other than horizontal. The sensor, actuator assembly and associated controls remain essentially unchanged except that the reference location for the seat is different and the wheelchair seat control will urge the seat to the reference position. It may be further desired to easily switch the reference position so that the seat maintains another value than perpendicular to the axis of gravity.

It is also contemplated that the automatic seat orienting or leveling feature can be selectively actuated and deactuated. There may be locations or periods of time (e.g., in a home, office, etc.) where the ground surface will not vary greatly from horizontal. Accordingly, the automated operation can be terminated. On the other hand, automated operation will be desired outside of these ideal environments so that automated operation is quickly and easily attained. For example, the controls may include an "automated" and "manual" mode switch to achieve these desired operations. In the "automated" mode, the wheelchair seat seeks to maintain a reference or level position. In the "manual" mode, the seat then maintains the position dictated by the wheelchair user.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is now claimed:

1. A self positioning wheelchair seat comprising:

a base;

wheels rotatably secured to the base;

a seat adapted to receive an occupant therein; and a mounting assembly for securing the seat to the base including (i) a joint interposed between the seat and base allowing at least two degrees of movement of the seat relative to the base, (ii) an actuator assembly extending between the seat and base, the actuator assembly being secured to the seat to permit the seat to pivot fore and aft, and side to side and;

(iii) a sensing device that indicates whether the seat is level relative to the ground surface and provides a signal to the actuator assembly for adjusting the position of the seat in response thereto.

2. The wheelchair seat as defined in claim 1 wherein the actuator assembly includes first and second actuators each having a first end secured to the base and a second end secured to the seat.

3. The wheelchair seat as defined in claim 2 wherein the actuators are secured to opposite sides of the seat at a rear portion thereof.

4. The wheelchair seat as defined in claim 2 wherein each actuator first end is pivotally mounted to the base to provide at least two degrees of freedom therebetween.

5. The wheelchair seat as defined in claim 4 wherein each actuator second end is pivotally mounted to the seat to provide two degrees of movement therebetween.

6. The wheelchair seat as defined in claim 1 wherein the sensing device includes first and second sensors mounted to the seat and 90 degrees apart.

7. The wheelchair seat as defined in claim 1 further comprising a controller allowing an occupant to selectively alter the orientation of the seat relative to the base.

8. A power wheelchair comprising:

a base;

a power source;

a seat for receiving an occupant therein;

first and second driven wheels rotatably secured to the base and operatively connected to the power source to move the wheelchair in a desired direction;

at least one freely rotating wheel that rotates in response to the movement of the driven wheels;

a universal joint interposed between the seat and base allowing movement of the seat relative thereto;

a sensing device that provides a signal if the seat moves to an undesired position; and at least one actuator interposed between the seat and the frame for varying the orientation of the seat in response to the signal from the sensing device.

9. The power wheelchair as defined in claim 8 wherein the actuator is operatively connected to the power source.

10. The power wheelchair as defined in claim 9 wherein the power source is a battery and the actuator includes a motor.

11. The power wheelchair as defined in claim 8 wherein the at least one actuator includes first and second actuators that each have a first end that is pivotally mounted to the base and a second end that is pivotally secured to the seat.

12. The power wheelchair as defined in claim 11 wherein the second ends of the first and second actuators are secured adjacent opposite sides of the seat.

13. The power wheelchair as defined in claim 8 wherein the joint between the seat and frame is a joint allowing movement having at least two degrees of freedom.

14. The power wheelchair as defined in claim 8 wherein the first and second actuators are linear actuators oriented at an angle of approximately 45 degrees to the base, first ends of the actuators secured to the base by pivotal joints and second ends of the actuators secured to the seat by pivotal joints to allow at least two degrees of movement of the seat relative to the base.

15. The power wheelchair as defined in claim 8 further comprising a controller allowing an occupant to selectively alter the orientation of the seat relative to the base.

16. A self-positioning wheelchair seat comprising:

a base;

wheels rotatably secured to the base;

a seat adapted to receive an occupant therein; and a mounting assembly for securing the seat to the base including;

(i) a joint interposed between the seat and base allowing at least two degrees of movement of the seat relative to the base;

(ii) an actuator assembly extending between the seat and base, the actuator assembly being secured to the seat to permit the seat to pivot fore and aft, and side to side, and (iii) a sensing device including first and second sensors mounted to the seat and 90 degrees apart, said sensing device indicating whether the seat is level relative to the ground surface and provides a signal to the actuator assembly for adjusting the position of the seat in response thereto.

17. A power wheelchair comprising:

a base;

a power source;

a seat for receiving an occupant therein;

first and second driven wheels rotatably secured to the base and operatively connected to the power source to move the wheelchair in a desired direction;

at least one freely rotating wheel that rotates in response to the movement of the driven wheels;

a joint interposed between the seat and base allowing movement of the seat relative thereto;

a sensing device that provides a signal if the seat moves to an undesired position; and a first and a second linear actuator interposed between the seat and the frame for varying the orientation of the seat in response to the signal from the sensing device, said first and second linear actuators being oriented at an angle of approximately 45 degrees to the base, first ends of the actuators secured to the base by pivotal joints, and second ends of the actuators secured to the seat by pivotal joints to allow at least two degrees movement of the seat relative to the base.

* * * * *